United States Patent [19]

Anderson

[11] Patent Number: 5,733,059
[45] Date of Patent: Mar. 31, 1998

[54] APPARATUS FOR COUPLING A CUTTING TOOL TO A VEHICLE

[76] Inventor: Edward E. Anderson, Rte. 4, Box 972, Salem, Mo. 65560

[21] Appl. No.: 642,499

[22] Filed: May 3, 1996

[51] Int. Cl.[6] ...................................................... F16D 3/80
[52] U.S. Cl. ..................... 403/31; 403/37; 403/81; 403/111; 56/10.4; 172/9; 37/403
[58] Field of Search .................................. 403/31, 34, 37, 403/52, 81, 111; 56/10.4, 15.2, 6, 228; 16/68, 235; 37/403, 468; 172/9, 328

[56] References Cited

U.S. PATENT DOCUMENTS

| 3,543,489 | 10/1968 | Maier et al. | 56/10.4 |
|---|---|---|---|
| 3,750,757 | 8/1973 | Saetti | 172/9 |
| 3,897,832 | 8/1975 | Leedahl et al. | 172/311 |
| 4,013,129 | 3/1977 | Wilkinson | 172/464 |
| 4,037,395 | 7/1977 | Henkensiefken et al. | 56/228 X |
| 4,304,087 | 12/1981 | Zweegers | 56/10.4 |
| 4,463,658 | 8/1984 | Heiser et al. | 91/388 |
| 4,506,464 | 3/1985 | Cartner | 56/10.4 X |
| 4,970,848 | 11/1990 | Neuerburg | 56/10.4 |
| 5,566,537 | 10/1996 | Kieffer et al. | 56/15.2 |

OTHER PUBLICATIONS

Rotac/Hyd–ro–ac–Hydraulic & Pneumatic Rotary Actuators published by Micro–Precision Operations, Inc., a Subsidiary of Textron, Inc., Berne, Indiana 46711, "HS Models High Pressure 3000 PSI Hollow Shaft", pp. HS–1 through HS–4.

*Primary Examiner*—Kenneth J. Dorner
*Assistant Examiner*—Bruce A. Lev
*Attorney, Agent, or Firm*—Hovey, Williams, Timmons & Collins

[57] ABSTRACT

An apparatus (10) for coupling a cutting tool (12) to a vehicle (14) such as a tractor that permits the cutting tool (12) to pivot to a released position when it contacts an obstruction (38) and that returns the cutting tool (12) to its cutting position at a controlled speed after the cutting tool has cleared the obstruction is disclosed. The coupling apparatus (10) includes a frame (18) pivotally coupled to the vehicle (14) and fixedly coupled with the cutting tool (12) and a rotary actuator (18) for pivoting the frame (16) and the cutting tool (12) between their cutting and released positions at a controlled speed.

2 Claims, 3 Drawing Sheets

APPARATUS FOR COUPLING A CUTTING TOOL TO A VEHICLE

BACKGROUND OF THE INVENTION

1. Field of the Invention

The present invention relates to an apparatus for coupling a cutting tool to the side of a vehicle. More particularly, the invention relates to such a coupling apparatus that permits a cutting tool to pivot to a released position when it contacts an obstruction such as a tree stump and that returns the cutting tool to its cutting position at a controlled speed once the cutting tool has cleared the obstruction.

2. Description of the Prior Art

Cutting tools such as power operated sickles are commonly attached to the sides of vehicles such as tractors for cutting grass, brush, and other growth from the sides of roadways and other areas. Unfortunately, a cutting tool and its associated mounting hardware are often damaged when the cutting tool collides with an obstruction such as a tree stump or a rock. If the tractor is moving at a high speed, the obstruction may even shear the cutting tool from the side of the tractor.

Mechanisms for reducing or preventing the above-described damage to side-mounted cutting tools are known in the art. One such mechanism includes a highly tensioned coil spring mounted between one side of the tractor and the end of the cutting tool adjacent the tractor. The coil spring permits the cutting tool to pivot about a vertical axis between a cutting position wherein the cutting tool extends generally perpendicular to the tractor and a released position wherein the cutting tool pivots rearwards to clear the obstruction.

Normally, the coil spring holds the cutting tool in its cutting position. However, when the cutting tool contacts an obstruction such as a stump or rock, the coil spring allows the cutting tool to pivot rearward to its released position to clear the obstruction. Then, when the cutting tool has cleared or passed the obstruction, the coil spring expands or recoils to pivot the cutting tool back to its cutting position.

A significant disadvantage of coil springs is that they do not provide a controlled return of the cutting tool to its cutting position after the cutting tool clears the obstruction. Instead, a coil spring will quickly and often violently return a cutting tool to its cutting position because the coil spring becomes tightly wound during the rearward pivotal movement of the cutting tool.

Those skilled in the art will appreciate that a quick return of a cutting tool to its cutting position is dangerous to anyone working near the cutting tool. Moreover, a quick return vibrates and often damages the tractor, the cutting tool and the support structure coupling the cutting tool to the tractor. This problem is especially dangerous when the tractor is operating on a hillside since the violent return of the cutting tool may cause the tractor to tip over.

Another disadvantage of coil springs is that they cannot be adjusted for controlling the amount of force that must be exerted on the cutting tool by the obstruction to cause the cutting tool to pivot to its released position. This is a problem because it is often desirable to adjust this force depending upon the type of area being mowed or cut. For example, if an area with a large number of stumps and rocks is being mowed, the operator of the tractor may wish to reduce the amount of force required to pivot the cutting tool to its released position to prevent damage to the cutting tool.

OBJECTS AND SUMMARY OF THE INVENTION

In view of the foregoing, it is an object of the present invention to provide an improved apparatus for coupling a cutting tool to a vehicle such as a tractor.

It is a more particular object of the present invention to provide a coupling apparatus that permits a cutting tool to pivot to a released position whenever it contacts an obstruction.

It is another object of the present invention to provide a coupling apparatus that returns a cutting tool from its released position back to its cutting position at a controlled rate after the cutting tool has cleared the obstruction.

It is another object of the present invention to provide a coupling apparatus that can be selectively adjusted for controlling the amount of force that must be exerted on the cutting tool to cause the cutting tool to pivot to its released position.

In view of these objects and other objects that become evident from the description of the preferred embodiment of the invention herein, an improved coupling apparatus for coupling a cutting tool to a vehicle is provided. The preferred coupling apparatus broadly includes frame means for coupling the cutting tool with the vehicle and pivoting means for pivoting the frame means and cutting tool about a vertical axis between a cutting position and a released position.

When the cutting tool contacts an obstruction, the pivoting means permits the frame means and the cutting tool to pivot from the cutting position to the released position. Then, once the cutting tool has cleared the obstruction, the pivoting means pivots the frame means and the cutting tool back to their cutting positions at a controlled speed.

In preferred forms, the coupling apparatus also includes control means for controlling the operation of the pivoting means. The control means includes adjusting means for adjusting the speed at which the pivoting means pivots the frame means to the cutting position after the cutting tool has cleared the obstruction and adjusting means for adjusting the amount of force that must be exerted on the cutting tool to cause the pivoting means to pivot the frame means and cutting tool from their cutting position to their released position when the cutting tool contacts an obstruction.

By constructing a coupling apparatus as described herein, numerous advantages are realized. For example, by providing pivoting means that pivots the cutting tool back to its cutting position at a controlled speed after the cutting tool has cleared an obstruction, injuries and damage resulting from violent recoils of cutting tools are eliminated.

Additionally, by providing adjusting means for adjusting the speed at which the pivoting means pivots the frame means and cutting tool back to their cutting positions, an operator can selectively adjust this recoil speed to accommodate different working conditions. For example, if the operator knows that other workers are working near the vehicle, he or she can reduce the recoil speed to increase safety.

Similarly, by providing adjusting means for adjusting the amount of force that must be exerted on the cutting tool to pivot the cutting tool to its released position, an operator can selectively adjust this speed to accommodate different mowing conditions. For example, if an area with a large number of stumps and rocks is being mowed, the operator can reduce this required force to prevent the cutting tool from becoming damaged.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENT

Figure 1:
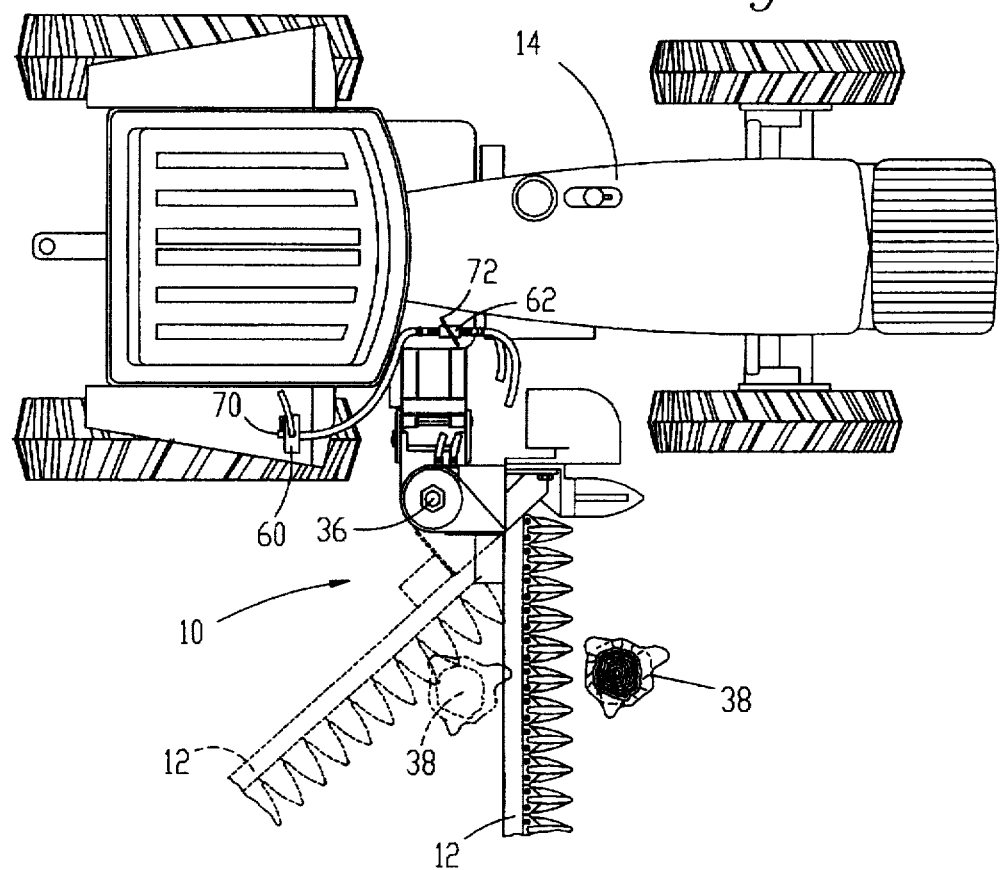
FIG. 1 is a plan view of the coupling apparatus of the invention shown supporting a cutting tool to a tractor, wherein the solid lines show the cutting tool in its cutting position and the dashed lines show the cutting tool pivoted rearward towards its released position.
Figure 2:
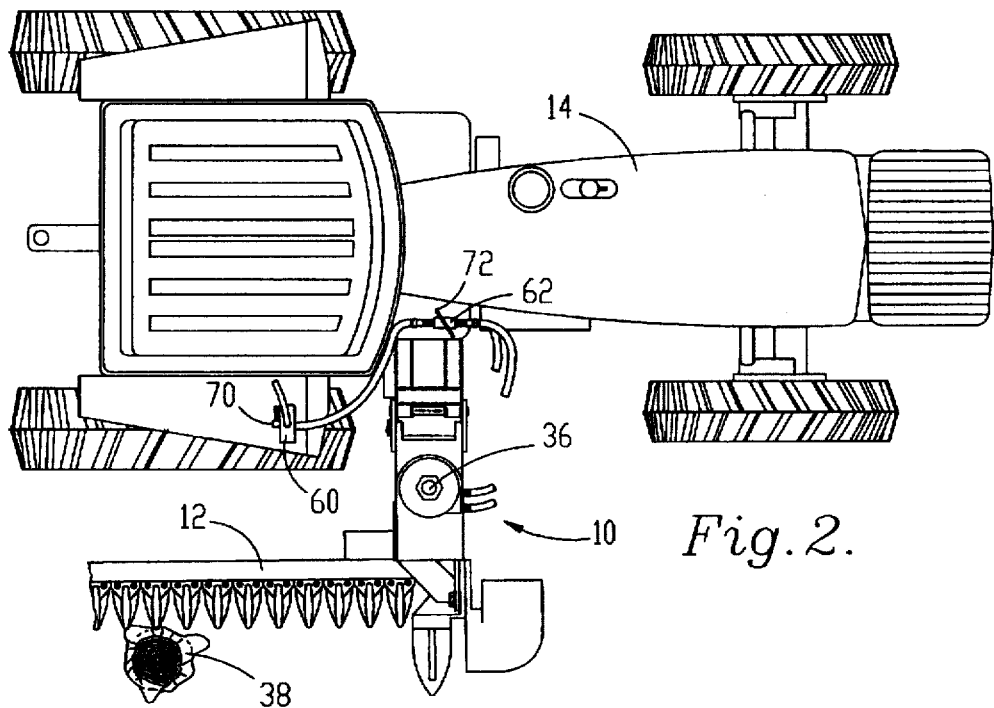
FIG. 2 is a plan view similar to FIG. 1 illustrating the cutting tool in its released position.
Figure 3:
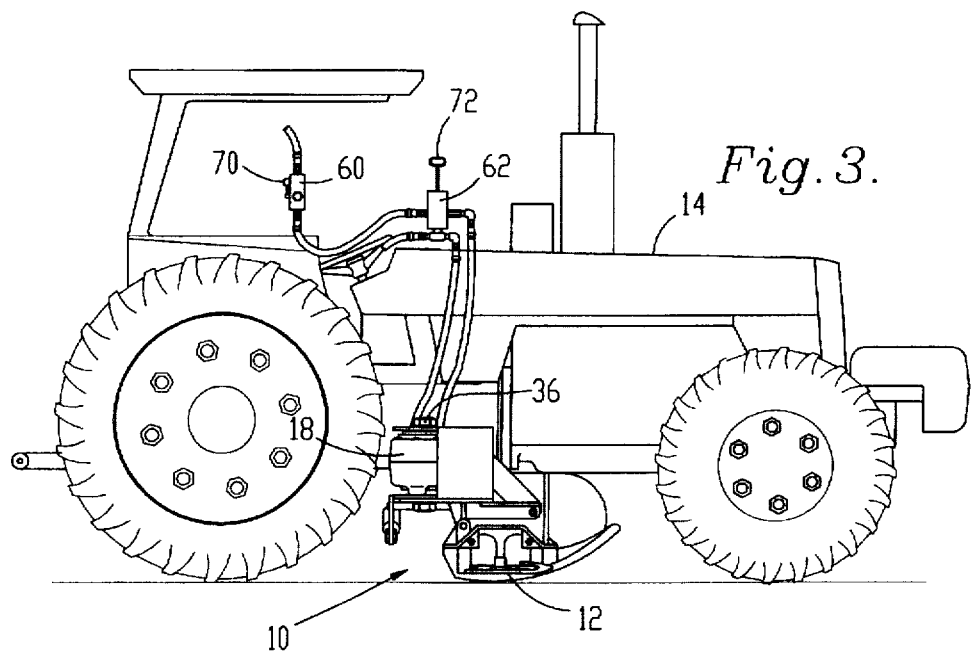
FIG. 3 is a side elevational view of the coupling apparatus, tractor, and cutting tool.
Figure 4:
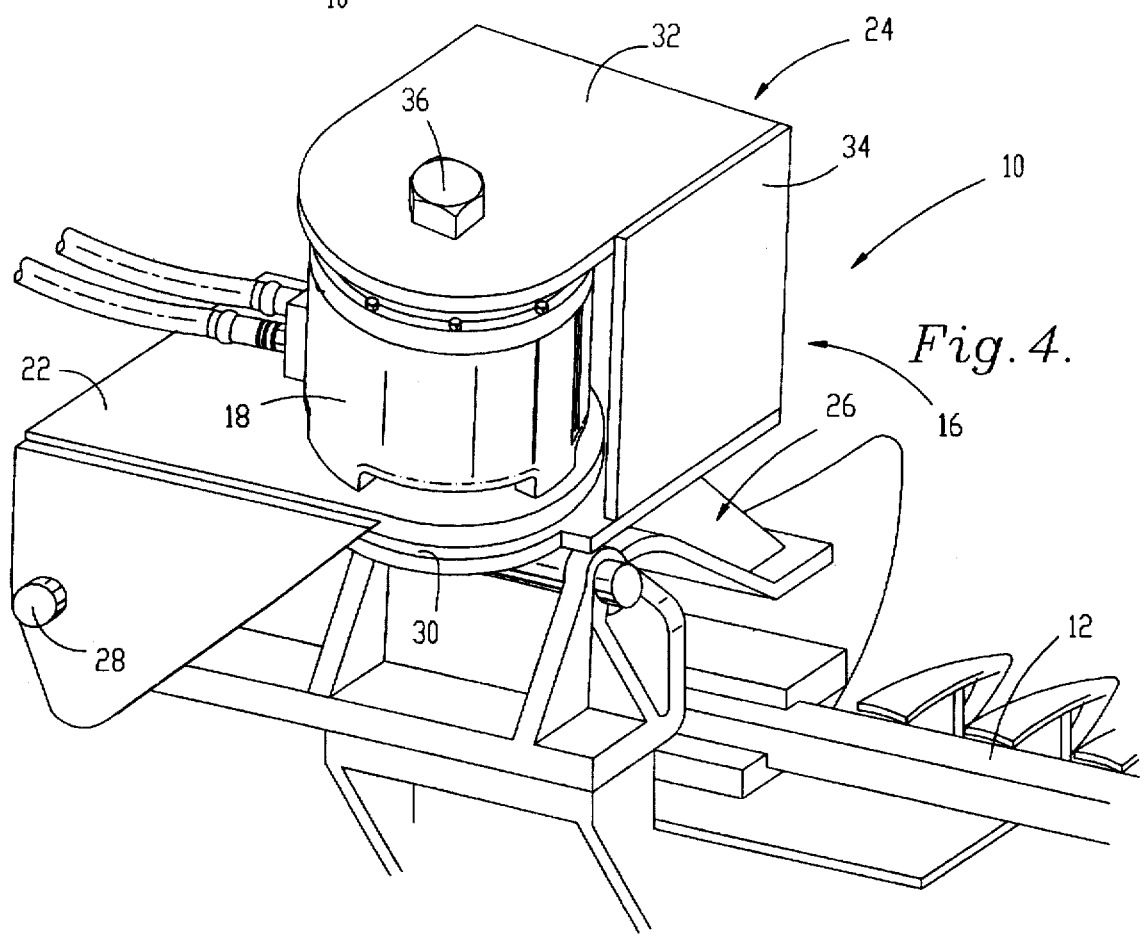
FIG. 4 is a perspective view of the coupling apparatus illustrating the components of the coupling apparatus in more detail.

Turning now to the drawing figures, and particularly FIG. 4, a coupling apparatus 10 constructed in accordance with a preferred embodiment of the invention is illustrated. As illustrated in FIGS. 1 and 2, the coupling apparatus 10 couples a conventional cutting tool 12 such as a power operated sickle to a conventional vehicle 14 such as a tractor.

Returning to FIG. 4, the coupling apparatus 10 broadly includes frame means generally referred to by the numeral 16 for coupling the cutting tool 12 to the vehicle 14 and pivoting means 18 for pivoting the frame means 16 about a vertical axis between a cutting position and a released position. The preferred coupling apparatus also includes control means 20 depicted in FIG. 7 for controlling the operation of the pivoting means.

In more detail, the frame means 16 includes a brace plate 22 for supporting the pivoting means 18 to the vehicle 14, a support frame 24 pivotally coupled with the brace plate 22 and the pivoting means 18 for transferring the pivoting motion of the pivoting means 18 to the cutting blade 12, and a cutting tool support plate 26 for attaching the cutting tool 12 to the support frame 24.

The brace plate 22 is pivotally connected to the tractor 14 by a horizontally-extending shaft 28 defining a horizontal pivot axis. The brace plate 22 pivots about the shaft 28 in a generally vertical direction, and may be coupled with a hydraulic cylinder (not shown) for shifting the brace plate 22 between lowered and raised positions for lowering and raising the cutting tool 12 relative to the ground in a conventional manner.

The support frame 24 is pivotally coupled with the brace plate 22 about a generally vertical pivot axis and includes a lower, horizontally extending plate 30, an upper, horizontally extending plate 32 spaced vertically from the lower plate 30, and a vertically extending side plate 34 interconnecting the upper and lower plates 30,32. The lower plate 30 is pivotally attached to the lower surface of the brace plate 22 by a conventional bolt or shaft, and the upper plate 32 is pivotally coupled to the upper end of the pivoting means 18 by a vertically extending shaft 36. As described in more detail below, the support frame 24 pivots relative to the brace plate 22 about the shaft 36.

The cutting tool support plate 26 rigidly the cutting tool 12 to the lower plate 30 of the support frame 24. Thus, the cutting tool 12 pivots with the support frame 24 about the same vertical axis defined by the shaft 36.

As best illustrated in FIGS. 1 and 2, the support frame 24 and the cutting tool 12 pivot about the shaft 36 between a cutting position and a released position. When the support frame 24 and cutting tool 12 are in their cutting positions, the longitudinal axis of the cutting tool 12 extends generally perpendicular to the longitudinal axis of the vehicle 14 as depicted by the solid lines in FIG. 1. Conversely, when the support frame 24 and cutting tool 12 are in their released positions, the longitudinal axis of the cutting tool 12 extends at an angle or parallel to the longitudinal axis of the vehicle 14 as depicted by the dashed lines in FIG. 1 and the solid lines in FIG. 2.

The horizontal pivotal movement of the support frame 24 and cutting tool 12 permits the cutting tool 12 to pivot rearward whenever it contacts an obstruction such as the tree stump 38 illustrated in FIGS. 1 and 2. Then, when the cutting tool 12 clears the obstruction 38, it is free to shift forward back to its cutting position. Those skilled in the art will appreciate that the degree of rearward pivotal movement of the cutting tool depends upon where the obstruction contacts the cutting tool along its length.

The pivoting means 18 pivots the support frame 24 and the cutting tool 12 between their cutting and released positions. The preferred pivoting means 18 is a rotary actuator such as the HS Model actuator manufactured by the Micro-Precision Textron Corporation of Berne, Ind. and sold under the trade names Rotac and Hyd-roac.

Figure 5:
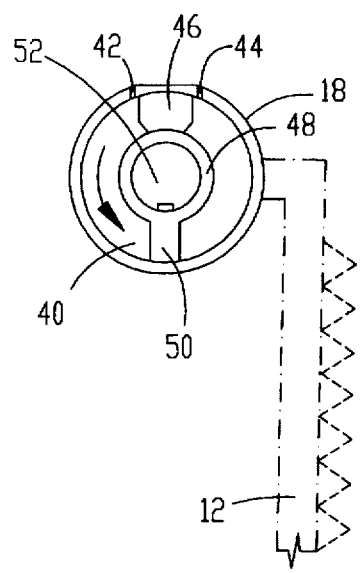
FIG. 5 is a schematic plan view of the pivoting means of the coupling apparatus illustrating the cutting blade in its cutting position.
Figure 6:
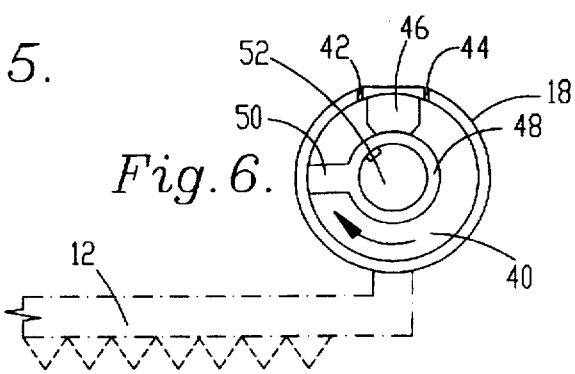
FIG. 6 is a schematic plan view of the pivoting means of the coupling apparatus illustrating the cutting blade in its released position.

As best illustrated in FIGS. 5 and 6, the rotary actuator 18 includes an enclosed cylindrical chamber 40 for receiving fluid therein, an inlet port 42 for delivering fluid to the chamber 40, an outlet port 44 for discharging fluid from the chamber 40, a stationery barrier 46 fixed within the chamber 40, a central, cylindrical shaft 48 pivotally moveable within the chamber 40 about a vertical axis, and a moveable vain 50 disposed within the chamber 40 and attached to the shaft 48. The shaft 48 includes a circular, hollow keyway 52 or wing shaft therein.

Returning to FIG. 4, the lower end of the rotary actuator 18 is fixedly coupled to the upper surface of the brace plate 22. The upper end of the rotary actuator 18 is pivotally coupled with the upper plate 32 of the support frame 24 by the shaft 36. The shaft 36 is inserted into the hollow keyway 52 of the rotary actuator 18 and bolted or otherwise fixedly attached to the upper plate 32 of the support frame 24. The shaft 36 moves with the shaft 48 of the rotary actuator 18 and pivots the support frame 24 and cutting blade 12 between their cutting and released positions as described in more detail below.

Figure 7:
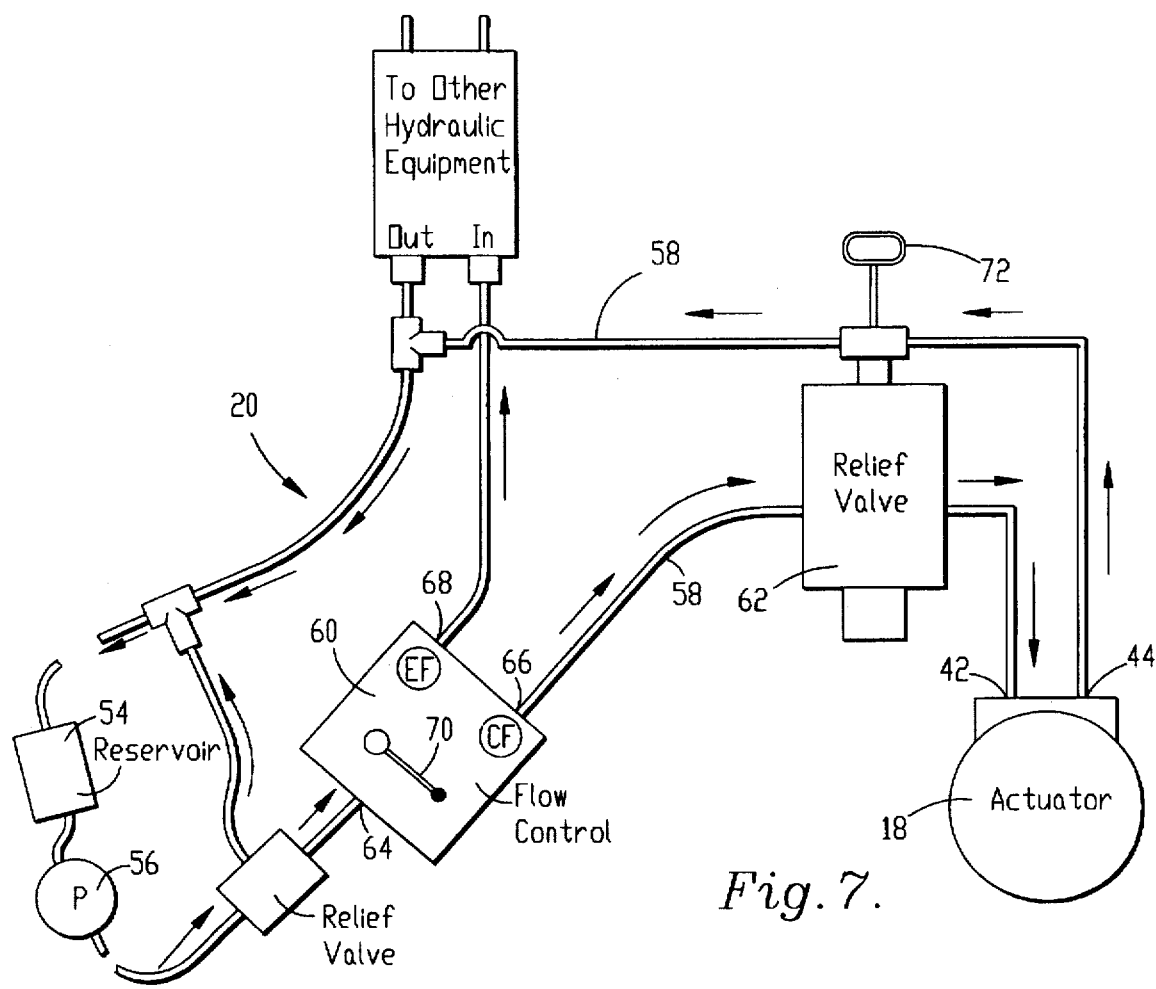
FIG. 7 is a schematic view of a control assembly for controlling the operation of the pivoting means of the coupling apparatus.

The rotary actuator 18 can be operated with either pneumatic or hydraulic fluids including air, oil, high water based fluids, or fire resistant fluids, but is preferably a hydraulic type actuator. As illustrated in FIG. 7, the rotary actuator 18 is coupled with a conventional hydraulic system including a reservoir 54 or tank of hydraulic fluid, a pump 56 for pumping the fluid from the reservoir 54, and hydraulic tubing 58 for delivering the hydraulic fluid to the rotary actuator 18 and back to the reservoir 54. The normal flow of the hydraulic fluid between the reservoir 54 and the rotary actuator 18 is indicated by the arrows in FIG. 7.

The control means 20 controls the operation of the rotary actuator 18 and includes a flow controller 60 and a relief valve 62. The flow controller 60 is interposed between the hydraulic pump 56 and the rotary actuator 18 for controlling the amount or pressure of hydraulic fluid diverted to the inlet port 42 of the rotary actuator 18. The flow controller 60 is conventional in construction and includes an inlet port 64 for receiving hydraulic fluid from the hydraulic pump 56, an outlet port 66 for diverting the fluid to the inlet port 64 of the rotary actuator 18, an outlet port 68 for diverting fluid to other existing hydraulic equipment on the vehicle 14, and a flow divider valve 70 for dividing the amount of fluid between the two outlet ports 64,66.

The relief valve 62 is interposed between the inlet port 42 of the rotary actuator 18 and the return line to the hydraulic reservoir 54 for directing hydraulic fluid that has been discharged from the inlet port 42 back to the hydraulic reservoir 54. The relief valve 62 is also interposed between the outlet port 44 of the rotary actuator 18 and the hydraulic reservoir 54 for directing hydraulic fluid that has been discharged from the outlet port 44. The relief valve 62 includes an adjustable control valve 72 for controlling the amount or pressure of the fluid being discharged from the inlet port 42 of the rotary actuator 18.

In operation, the coupling apparatus 10 described above pivots the cutting tool 12 between its cutting and released positions for permitting the cutting tool 12 to clear obstructions such as the tree stump 38 illustrated in FIGS. 1 and 2. The support frame 24 and cutting tool 12 are initially pivoted to their cutting positions illustrated by the solid lines in FIG. 1 by pumping hydraulic fluid to the inlet port 42 of the rotary actuator 18 as illustrated by the arrows in FIG. 7. The hydraulic fluid exerts pressure on the moveable vain 50 of the rotary actuator 18 and moves the moveable vain 50, the shaft 48 and the shaft 36 counterclockwise as depicted by the arrow in FIG. 5. This counterclockwise force is transferred to the support frame 24 and the cutting blade 12 to pivot the cutting blade 12 by the shaft 36 to its cutting position.

If the cutting tool 12 contacts an obstruction during operation, the obstruction exerts a rearward force on the cutting blade 12 which is transferred to the support frame 24, the shaft 36 and the shaft 48. This rearward force exerts a clockwise force on the moveable vain 50 as depicted by the arrow in FIG. 6. If the clockwise force is greater than the forward pressure of the hydraulic fluid in the rotary actuator 18, the moveable vain 50 discharges the hydraulic fluid from the inlet port 42 of the rotary actuator 18 in a direction opposite to the direction indicated by the arrows in FIG. 7. The relief valve 62 then diverts the hydraulic fluid back to the hydraulic reservoir 54.

Advantageously, the relief valve 62 permits the operator to adjust the amount of force that must be exerted on the cutting tool 12 by the obstruction 38 to reverse the flow of hydraulic fluid in the rotary actuator 18 and thereby pivot the support frame 24 and cutting tool 12 from their cutting positions to their released positions. For example, if the operator wishes to increase the amount of force required to shift the support frame 24 and cutting blade 12 to their released positions, the operator can adjust the control valve 72 to reduce the amount of hydraulic fluid being diverted back to the hydraulic reservoir 54. This allows the rotary actuator 18 to maintain the support frame 24 and cutting blade 12 in their cutting positions unless large obstructions are contacted.

Conversely, if the operator wishes to decrease the amount of force required to shift the support frame 24 and cutting blade 12 to their released positions, the operator can adjust the control valve 72 to increase the amount of hydraulic fluid being diverted back to the hydraulic reservoir 54. This allows the rotary actuator 18 to more quickly pivot the support frame 24 and cutting blade 12 to their released positions when the cutting blade 12 contacts an obstruction to minimize or eliminate any damage to the cutting blade 12.

Once the cutting tool 12 has cleared the obstruction 38 as illustrated in FIG. 2, the clockwise force that was exerted on the shaft 48 and moveable vain 50 of the rotary actuator 18 and the shaft 36 is removed. Thus, the hydraulic pump 56 reestablishes the normal flow of hydraulic fluid into the inlet port 42 of the rotary actuator 18 as indicated by the arrows in FIG. 7. This once again causes the hydraulic fluid to exert a forward pressure on the moveable vain 50 to move the moveable vain 50, the shaft 48 and the shaft 36 counterclockwise as viewed in FIG. 5. This counterclockwise force is transferred to the support frame 24 and the cutting blade 12 to pivot the cutting blade 12 back to its cutting position.

Advantageously, the flow controller 60 permits the operator to adjust the speed at which the rotary actuator 18 pivots the support frame 24 and cutting blade 12 back to their cutting positions after the cutting tool 12 has cleared the obstruction 38. For example, if the operator wishes to increase the speed at which the support frame 24 and cutting blade 12 are pivoted back to their cutting positions, the operator can adjust the flow divider valve 70 to divert more hydraulic fluid to the input port 42 of the rotary actuator 18.

Conversely, if the operator wishes to decrease the speed at which the support frame 24 and cutting blade 12 are pivoted back to their cutting positions, the operator can adjust the flow divider valve 70 to divert less hydraulic fluid to the input port 42 of the rotary actuator 18.

Although the invention has been described with reference to the preferred embodiment illustrated in the attached drawing figures, it is noted that equivalents may be employed and substitutions made herein without departing from the scope of the invention as recited in the claims. For example, although the coupling apparatus of the invention has been described and illustrated as being useful for coupling a sickle to the side of a tractor, it can also be used to couple other cutting tools to other vehicles.

Having thus described the preferred embodiment of the invention, what is claimed as new and desired to be protected by Letters Patent includes the following:

1. An apparatus for coupling a cutting tool to a vehicle, the cutting tool and the vehicle both presenting longitudinal axes, the apparatus comprising:

a brace plate for attaching to the vehicle;

a support frame for attachment to the cutting tool;

structure for pivotally mounting the support frame to the brace plate about a vertical axis so that when the brace plate is attached to the vehicle and the cutting tool is attached to the support frame the support frame allows pivotal movement of the cutting tool between a cutting position wherein the longitudinal axis of the cutting tool extends generally perpendicular to the longitudinal axis of the vehicle and a released position wherein the longitudinal axis of the cutting tool extends at an acute angle relative to the longitudinal axis of the vehicle;

a rotary actuator operatively coupled between the brace plate and the support frame and including a shaft rotatable about the vertical axis for pivoting the support frame about the vertical axis and positioning the cutting tool between the cutting and released positions, the rotary actuator including an input port for receiving hydraulic fluid at a pressure level for rotating the shaft in a first direction for positioning the cutting tool to the cutting position and for discharging hydraulic fluid from the rotary actuator at a pressure level when the cutting tool strikes an obstruction and rotates the shaft in a second direction; and an adjustable relief valve operably coupled with the inlet port of the actuator for controlling the pressure level of the hydraulic fluid discharged from the rotary actuator for controlling the amount of force that must be exerted on the cutting tool by the obstruction to position the cutting tool to the released position.

2. The apparatus as set forth in claim 1, further including a flow controller operably coupled with the input port of the actuator for controlling the pressure level of the hydraulic fluid delivered to the inlet port for controlling the speed at which the actuator positions the cutting tool to the cutting position.

* * * * *